3,003,892
METHOD OF MARKING POLYETHYLENE AND RESULTANT ARTICLE
Albert A. Shannon, Rochester, N.Y., assignor to Eastman Kodak Company, Rochester, N.Y., a corporation of New Jersey
No Drawing. Filed Oct. 17, 1957, Ser. No. 690,614
2 Claims. (Cl. 117—47)

This invention concerns a process for marking polyethylene using an electrostatic process.

Polyethylene has received wide acceptance as a polymeric material which can be used for a great number of applications. For instance, it may be used to make the well-known squeeze bottles and it may be used to provide various films for coating paper and the like. However, when a polyethylene surface is printed with conventional printing ink, the printed matter does not have a strong adhesion to the polyethylene surface and tends to break away from the surface with normal handling and it has been customary in many instances to bake the printed articles at about 100–250° F.

A great number of treatments have been suggested to overcome this disadvantage in the use of polyethylene. Included among the surfaces treatments of polyethylene are flame treatments described in U.S. Patents 2,632,921, 2,648,097, 2,683,894, and 2,704,382. Other treatments have been suggested such as treating the surface with chlorine gas, bombarding with electrons, irradiating the surface, treating with various corrosive materials such as tetrafluoracetic acid and the like. Most of these treatments have been directed to making the surface itself less hydrophobic.

According to U.S. Patent 2,795,820, the results obtained from certain flame treatments have not been completely satisfactory due to the poor aging characteristics of the flame treated polyethylene surface with respect to its ink adhesion, sealing strength, and the like.

I have discovered a method of printing and marking on a polyethylene surface which does not require the step of flame-treating or otherwise making the surface less hydrophobic but simply involves the use of a special ink for marking polyethylene combined with an electrostatic printing process.

One object of my invention is to provide a new ink for marking polyethylene. An additional object is to provide a method for marking polyethylene. An additional object is to provide a method and ink which may be used for marking hydrophobic surfaces such as displayed by polyethylene, polypropylene and the like.

In carrying out my invention I use 5–15 percent by weight polymerized butylmethacrylate dissolved in 95–40 percent by weight Hi-Flash solvent naphtha 2–50W. If desired, up to about 50 percent of the solvent content may be xylene.

The following examples illustrate the ink used in my invention but are not intended to limit it in any way.

EXAMPLE 1

*Blue ink*

|  | Grams |
|---|---|
| Polybutylmethacrylate | 10 |
| Hi-Flash solvent naphtha 2–50W | 90 |
| Brilliant Oil Blue BMA | 5.0 |

Brilliant Oil Blue BMA is described in U.S. Patent 2,211,943 as an unsymmetrical 1,4-dialkyd-amino-anthraquinone derivative, and is listed as color index Solvent Blue No. 16.

EXAMPLE 2

*Red ink*

|  | Grams |
|---|---|
| Polybutylmethacrylate | 10 |
| Hi-Flash solvent naphtha 2–50W | 90 |
| Oil Red O | 10 |

Oil Red O is a di-azo dye and is listed as color index Solvent Red No. 27 or color index 26125.

EXAMPLE 3

*Black ink*

|  | Grams |
|---|---|
| Polybutylmethacrylate | 10 |
| Hi-Flash solvent naphtha 2–50W | 90 |
| Brilliant Oil Blue BMA | 4.0 |
| Oil Orange No. 2311 | 2.0 |

Oil Orange No. 2311 is a benzene-azo-beta-naphthol, and is listed as color index No. 24.

Solvent Naphtha 2–50W is a coal tar fraction having a boiling point 150° to 200° C. and a flash point not below 37.8° C.

In my preferred method of coating polyethylene, the polyethylene is charged with static electricity, and the ink is applied from a steel pen or other suitable applicator without touching the static-charged polyethylene with the applicator. The distance of the applicator from the static-charged polyethylene depends on the quantity of the static charge on the polyethylene. Rapid coating is possible since the ink is absorbed almost instantly into the polyethylene making it possible to handle the product without any delay.

Polyethylene surfaces which have been coated as described in this application can be subjected to cleaning with such products as detergents, soaps and organic solvents. Moreover, the ink remains absorbed in the polyethylene when it is dried so that it will not be removed with organic solvents.

Various electrostatic processes may be used for marking polyethylene according to my invention. For instance, an electrostatic coating method which can be used for coating polyethylene according to my invention comprises moving the article to be coated by a conveyor along a predetermined path spaced from a discharge or ionizing electrode. The high-voltage source is associated with the discharge electrode for creating an electrostatic field to surround the articles. Finely divided coating material is introduced into the electrostatic field for deposition upon the articles.

I claim:

1. A method for marking polyethylene comprising marking the polyethylene by charging the polyethylene with static electricity and applying an ink consisting of 5–15% by weight polybutylmethacrylate, 85–95% by weight Hi-Flash solvent naphtha, and a dye selected from the class consisting of Brilliant Oil Blue BMA, Oil Red O, and Yellow O 2311 to the surface of the static charged polyethylene.

2. A polyethylene substrate marked according to the process described in claim 1.

References Cited in the file of this patent

UNITED STATES PATENTS

| | | |
|---|---|---|
| 2,173,741 | Wise et al. | Sept. 19, 1939 |
| 2,204,517 | Strain | June 11, 1940 |
| 2,324,959 | Stevens et al. | July 20, 1943 |
| 2,633,796 | Pethick | Apr. 7, 1953 |
| 2,647,464 | Ebert | Aug. 4, 1953 |
| 2,662,833 | Helmuth | Dec. 15, 1953 |
| 2,698,814 | Ransburg | Jan. 4, 1955 |
| 2,708,188 | Goldstein | May 10, 1955 |
| 2,776,907 | Carlson | Jan. 8, 1957 |
| 2,823,146 | Roberts et al. | Feb. 11, 1958 |
| 2,864,756 | Rothacker | Dec. 16, 1958 |
| 2,910,723 | Traver | Nov. 3, 1959 |

OTHER REFERENCES

"Plastic Properties Chart," Modern Plastic Encyclopedia, issue 1957, vol. 35, No. 1A.